(Model.)

E. H. COOPER.
DRAFT EQUALIZER.

No. 280,135. Patented June 26, 1883.

WITNESSES:
Chas. T. Howell,
C. Sedgwick

INVENTOR:
E. H. Cooper
BY Munn & Co
ATTORNEYS.

UNITED STATES PATENT OFFICE.

EARL H. COOPER, OF WINTERS, CALIFORNIA.

DRAFT-EQUALIZER.

SPECIFICATION forming part of Letters Patent No. 280,135, dated June 26, 1883.

Application filed February 13, 1883. (Model.)

*To all whom it may concern:*

Be it known that I, EARL H. COOPER, of Winters, Yolo county, California, have invented a new and Improved Draft-Equalizer, of which the following is a full, clear, and exact description.

My invention consists of a draft-equalizer in which the single horse is attached to the short arm of the main double-tree.

Reference is to be had to the accompanying drawings, forming part of this specification, in which similar letters of reference indicate corresponding parts in both figures.

Figure 1:
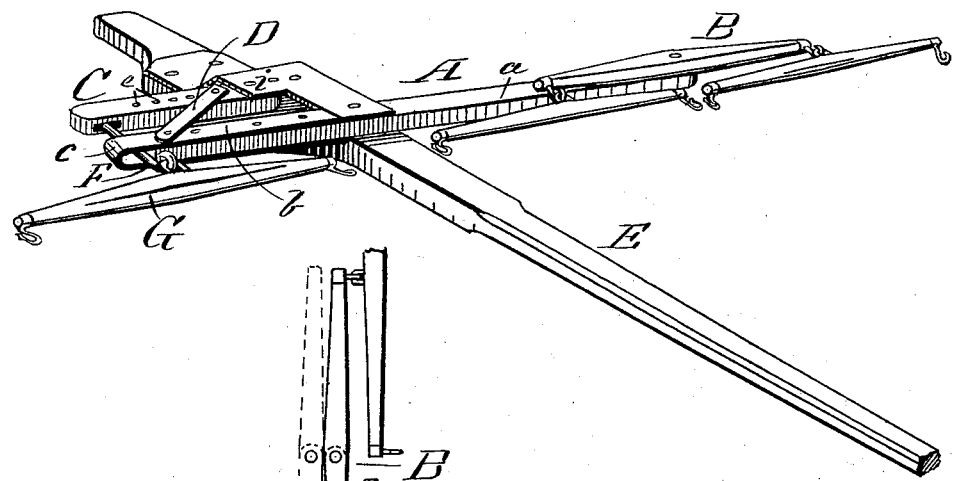
Figure 2:
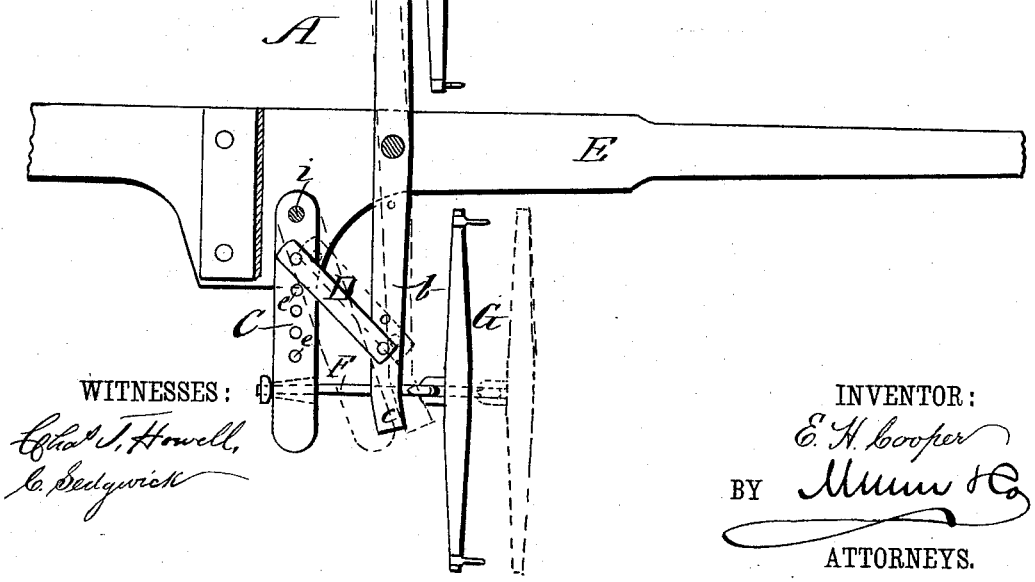

Figure 1 is a perspective view of my new and improved draft-equalizer, and Fig. 2 is a sectional plan view of the same.

A represents the main double-tree, to the long arm $a$ of which the span of horses is attached by the set of whiffletrees B in the ordinary way. The short arm $b$ of this main double-tree is provided with the loop $c$, and is connected with the rear supplemental lever, C, by the connecting-rod D. The supplemental lever C is pivoted at $i$ to the tongue E, or some other rigid part, and is provided at its outer end with the hook F, which passes through the loop $c$, for receiving the staple of the single-tree G, as shown clearly in the drawings. The connecting-rod D is pivoted to the short arm of the main double-tree A, near its outer end, and passes diagonally back, and is pivoted to the supplemental lever C, near its fulcrum-pivot $i$, so that by this lever a great advantage is gained for the single horse, and this advantage is transferred through the connecting-rod D to the short arm $b$ of the main double-tree A, and thus serves to equalize the draft to all three of the horses.

To increase or diminish the advantage of the single horse, I form the series of holes $e$ through the supplemental lever C, and adapt the rear end of the connecting-rod D to be adjusted thereon to and from its fulcrum-pivot $i$, to shorten or lengthen the leverage, as may be desired.

This equalizer is more especially adapted for use in many kinds of harvesting-machines where it is necessary to have the off or right-hand horse travel near the tongue.

Having thus described my invention, I claim as new and desire to secure by Letters Patent—

In a draft-equalizer, the combination, with the double-tree B, having the loop or eye $c$, of the supplemental lever C, pivoted to the tongue in rear of the short arm of the double-tree, and connected to the said arm of double-tree by the pivoted link or rod D, and the single-tree-attaching rod F, connected to the outer end of the lever C, and extending through the loop $c$ of the double-tree, substantially as and for the purpose set forth.

EARL HENRY COOPER.

Witnesses:
J. B. MCARTHUR,
VENABLE MORRIS.